UNITED STATES PATENT OFFICE.

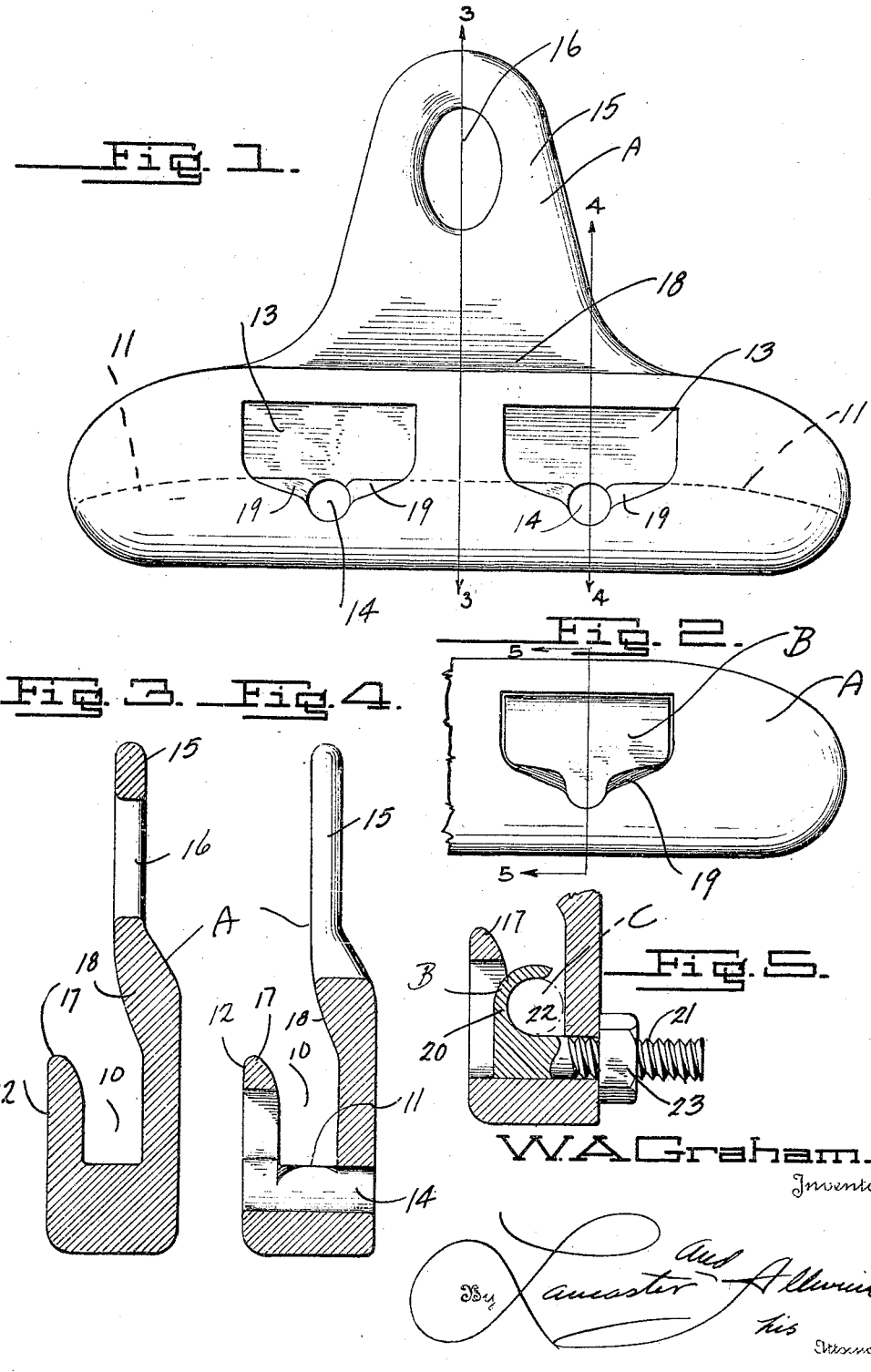

WALTER A. GRAHAM, OF SALISBURY, NORTH CAROLINA.

SUSPENSION-CLAMP FOR CABLES.

1,373,421.  Specification of Letters Patent.  Patented Apr. 5, 1921.

Application filed June 11, 1920. Serial No. 388,383.

*To all whom it may concern:*

Be it known that I, WALTER A. GRAHAM, a citizen of the United States, residing at Salisbury, in the county of Rowan and State of North Carolina, have invented certain new and useful Improvements in Suspension-Clamps for Cables, of which the following is a specification.

This invention relates to improvement in suspension clamps for use in supporting aerial cables such as electric conductors or the like.

An important object of this invention is to provide a suspension clamp which can effectively be made to clamp or can be unclamped from a cable without the disconnection of any of its parts.

A further object of the invention is the provision of an efficient and durable device, simple in construction, and one which can be used to clamp high current electric cables with ease and a minimum amount of danger to persons associated with the work of cable suspension.

Other objects and advantages of the invention will be apparent during the course of the following description.

In the accompanying drawings forming a part of this specification, and in which like characters are employed to designate like parts throughout the same, Figure 1 is a front elevation of the suspension clamp supporting body.

Fig. 2 is a fragmentary view of the supporting body and a clamping bolt inserted therein.

Fig. 3 is a cross sectional view of the supporting body taken on the line 3—3 of Fig. 1.

Fig. 4 is a cross sectional view of the supporting body taken on the line 4—4 of Fig. 1.

Fig. 5 is a fragmentary cross sectional view taken on the line 5—5 of Fig. 2.

In the drawings, wherein for the purpose of illustration is shown a preferred embodiment of my invention, the letter A designates the supporting body of the suspension clamp, and B the bolt used in clamping the cable or electric conductor C in the supporting body A.

The supporting body A is preferably constructed in the shape of a hook, the hooked end being provided with a longitudinal groove 10 having a preferably convex surface 11 for the reception of a cable C. An upstanding front leg 12 of the hooked end of the body A is provided with a plurality of openings 13, substantially rectangular in shape, the openings 13 communicating with smooth bores 14 provided in the supporting body immediately below the level of the convex surface 11 and extending through the back of said supporting body. Rear leg 15 of the supporting body A is relatively longer than the leg 12 extending considerably above the top thereof, and is tapered toward its top. An aperture 16 is provided in the upper portion of leg 15 for the reception of suspension insulators or some other suspending means (not shown). The supporting body is preferably constructed of galvanized steel or iron and in order to permit ready entrance of the cable C into the groove 10, rounded surfaces 17 and 18 are provided upon the legs 12 and 15 respectively. It is furthermore preferred that the supporting body be provided with rounded sloping surfaces 19 upon the convex surface 11 and adjacent the smooth bores 14 to facilitate the entrance of the bolt B into the supporting body A.

The bolt B is of special construction having a hooked head or jaw head 20 disposed upon an end and to one side of the relatively long screw threaded portion 21, and is of such shape and dimensions as to permit ready insertion into the aperture 14 in order that an inside face 22 of the hooked end of the bolt can snugly engage the cable C. The threaded portion 21 of the bolt B extends through the supporting body A and a relatively long portion thereof projects from the back thereof. A nut 23 is adapted to engage this projecting threaded portion and is adjustable thereon to clamp or release the cable C from the hooked head 20 without detachment from the bolt B.

The suspension clamps can be provided with one or any number of the hooked bolts B, it being merely necessary to suit the number to the particular need.

In operation, the devices are assembled with the bolts B loosely fitting in the bores 14 of the supporting body A and are attached to suspension insulators or other means (not shown) through aperture 16. A cable C is then placed in the longitudinal groove 10 and the nuts 23 tightened upon the bolts B and against the back of the supporting body until the inside face 22 of the jaw head 20 snugly engages the cable C and securely holds it in fixed relation to the supporting body. It is at once apparent that the nut 23 can be loosened upon threaded portion 21 of the bolt until the cable C can be disengaged from the suspension clamp without entirely removing the nut from its bolt.

It is to be understood that the form of my invention herewith shown and described is to be taken as a preferred example of the same and that various changes and modifications in the shape, size and arrangement of parts may be resorted to without departing from the spirit of the invention or the scope of the subjoined claims.

I claim:

1. In a suspension clamp for cables, the combination of a cable supporting body having a longitudinal groove therein for the reception of a cable and having openings in the face thereof, bolts carried by said supporting body having relatively broad hooked heads thereon to engage a cable in the longitudinal groove and adapted for free insertion through the openings in the face of the supporting body, said bolts having relatively long threaded portions projecting through the opposite side of the supporting body, and nuts carried by said threaded portions and adapted for adjustment thereon to clamp or unclamp the cable without disconnection of any of the parts of the suspension clamp.

2. In a suspension clamp for cables, the combination of a cable supporting body having a convex longitudinal groove therein for the reception of a cable, said supporting body having openings in the face thereof and bores communicating therewith and extending laterally through the supporting body and below the plane of the floor surface of the longitudinal groove therein, and bolts adapted for insertion through said openings and into said bores for detachably supporting a cable.

3. In a suspension clamp for cables, the combination of a hook shaped supporting body, provided with a longitudinal groove for the reception of a cable, said support provided in its forward face with a plurality of substantially rectangular shaped openings, and having bores extending laterally therethrough and below the surface of the longitudinal groove, a plurality of bolts having rectangular shaped hooked heads adapted for insertion through the rectangular openings in the supporting body, and provided with shanks for insertion in the bores of said supporting body, and nuts for said bolts to detachably clamp a cable to the supporting body.

WALTER A. GRAHAM.